United States Patent
Fujibayashi et al.

(10) Patent No.: US 7,174,235 B2
(45) Date of Patent: Feb. 6, 2007

(54) CONTROLLER FOR MACHINES

(75) Inventors: Kentaro Fujibayashi, Musashino (JP); Yusaku Yamada, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/812,025

(22) Filed: Mar. 30, 2004

(65) Prior Publication Data

US 2004/0204774 A1 Oct. 14, 2004

(30) Foreign Application Priority Data

Apr. 11, 2003 (JP) ............................. 2003-108073

(51) Int. Cl.
G05B 11/01 (2006.01)
G05B 19/42 (2006.01)
G06F 19/00 (2006.01)

(52) U.S. Cl. ...................... 700/181; 700/18; 700/23; 700/86; 700/159

(58) Field of Classification Search .................. 700/18, 700/23, 86, 159, 180, 181, 186, 192, 193, 700/245; 425/135, 145, 155
See application file for complete search history.

(56) References Cited

U.S. PATENT DOCUMENTS 6,328,551 B1 * 12/2001 Takatsugi et al. ........... 425/145
6,427,098 B1 * 7/2002 Alverson et al. ........... 700/180
6,470,225 B1 * 10/2002 Yutkowitz ................... 700/188
6,701,212 B2 * 3/2004 Shiba et al. ................. 700/186
2002/0056933 A1 * 5/2002 Kamiguchi et al. ......... 425/165

FOREIGN PATENT DOCUMENTS

JP     1-197807     8/1989
JP     2002-073120     3/2002

OTHER PUBLICATIONS

Notice of Reasons for Rejection (Office Action) dated Apr. 12, 2005 and English translation.

* cited by examiner

*Primary Examiner*—Leo Picard
*Assistant Examiner*—Charles Kasenge
(74) *Attorney, Agent, or Firm*—Staas & Halsey LLP

(57) ABSTRACT

Control programs for machine tools and industrial machines include programs that control axis motion, and programs, that periodically execute machine sequence control. Both the axis motion control programs and the sequence programs are coded in an NC program format. The controller analyzes the sequence programs created in NC program format, converts them into executable form, and executes the executable-form programs periodically from when power to the machine is turned on until the power is shut down.

16 Claims, 3 Drawing Sheets

FIG. 2A
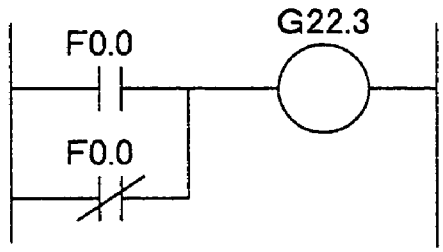
FIG. 2B
//#IOG[22,3]=1
FIG. 3A
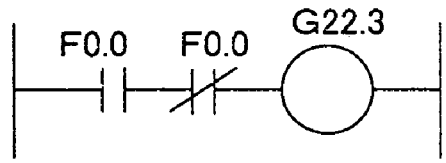
FIG. 3B
//#IOG[22,3]=0
FIG. 4A
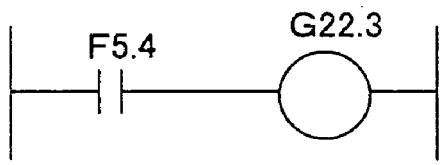
FIG. 4B
//IF[#IOF[5,4]==1]
//#IOG[22,3]=1;
//ELSE
//#IOG[22,3]=0;
FIG. 5A
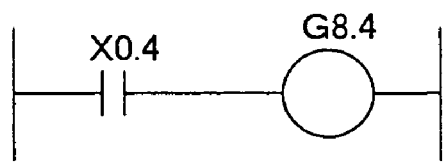
FIG. 5B
//#IOG[8,4]=#IOX[0,4];

CONTROLLER FOR MACHINES

BACKGROUND OF THE INVENTION

1. Field of the Invention

The present invention relates to a controller that controls both axis motion and machine sequences of a machine tool or industrial machine.

2. Description of the Related Art

The known controllers for controlling machine tools and industrial machines include numerical controllers and programmable controllers. These controllers perform motion control, in which axis motion is controlled, and sequence control, in which the machine's signals etc. are controlled, so as to operate the machine for various purposes.

To control a machine tool or industrial machine, both programs for motion control and programs for sequence control are created and executed, thereby operating the machine.

When a machine tool or the like is controlled by a numerical controller, the motion control programs that are generally used are NC programs coded in, for example, the EIA or ISO format; these programs may also include macro statements or the like.

Numerical controllers, programmable controllers, and the like are also used in motion controllers that control industrial machines; some of these controllers use NC programs, while others use a so-called motion language. Motion languages include languages based on the G codes used in NC programs, structural function chart (SFC) languages, and function block diagram (FBD) languages.

Sequence control programs are coded in languages such as a ladder diagram language, instruction list language, or SFC language.

Programmers were therefore burdened by the need for knowledge of a plurality of types of programming in order to create motion control and sequence control programs.

To reduce the programmer's burden, Japanese Patent Application Laid-Open No. 2002-73120 proposes a programming apparatus that converts motion language programs into a language such as ladder diagram language with code that is executed at fixed intervals.

In the technology described in the above patent application, a program created in motion language by using the programming apparatus is converted into ladder diagram language or another language for execution at fixed intervals, written into memory in the programming apparatus, and then written into a programmable controller. This procedure is followed because the programmable controller is unable to execute motion language programs; programs created in motion language by the programming apparatus cannot be executed until they have been converted into a language such as ladder diagram language. In this procedure, however, the user is hindered by having to perform a compilation process, and programs coded in motion language cannot be executed in real time.

Another problem is that in addition to the programmable controller, a specific apparatus for converting motion language into ladder diagram language or another language is needed, increasing the cost to the user.

SUMMARY OF THE INVENTION

The controller according to the present invention controls a machine such as a machine tool or industrial machine according to control programs which are created in NC program format. The controller comprises: a storage means for storing the control programs created in NC program format in a way that distinguishes between programs to be executed periodically and programs to be executed on command; a conversion means for analyzing the programs stored in the storage means and converting the programs into a form executable by the controller; and an execution means for periodically executing the program to be executed periodically, converted by the conversion means into the executable form, from the time when power to the machine is turned on until the time when the power is shut down.

Each of the programs to be executed periodically may perform sequence control for the machine tool or industrial machine. The program may be coded by coding the signal names and addresses of input/output signals to and from the machine and controller together with commands for controlling the input/output signals. The signal names and addresses of the input/output signals may be coded with alphanumeric characters. A sequence control program may also include conditions for executing the control commands.

The programs that are executed on command control axis motion of the machine. The storage means may store the executable-form programs obtained by conversion of the programs to be executed periodically by the conversion means together with the programs to be executed periodically, or instead of the programs to be executed periodically. The conversion means may convert the programs to be executed periodically into executable-form programs when the machine is turned on or when the programs are stored in the storage means.

The programs to be executed periodically may be distinguished from the programs to be executed on command by their program names or by a specific symbol added to each command coded in a program to be executed periodically.

The present invention provides a controller that uses the NC program coding format for both programs such as sequence control programs that are executed periodically and programs such as axis motion control programs that are executed on command, so the controller can perform both types of control without the need for special apparatus.

BRIEF DESCRIPTION OF THE DRAWINGS

The purposes and advantages of the present invention, including those described above, will be clarified by reference to the attached drawings in combination with the description of the embodiment presented below. Of these drawings:

FIGS. 2A and 2B illustrate a correspondence between a ladder program indicating an always-true expression and a program in this embodiment;

FIGS. 3A and 3B illustrate a correspondence between a ladder program indicating an always-false expression and a program in this embodiment;

FIGS. 4A and 4B illustrate a correspondence between a ladder program indicating a conditional expression and a program in this embodiment;

FIGS. 5A and 5B illustrate a ladder program equivalent to an emergency stop function and a program in this embodiment.

DESCRIPTION OF THE EMBODIMENT

Figure 1:
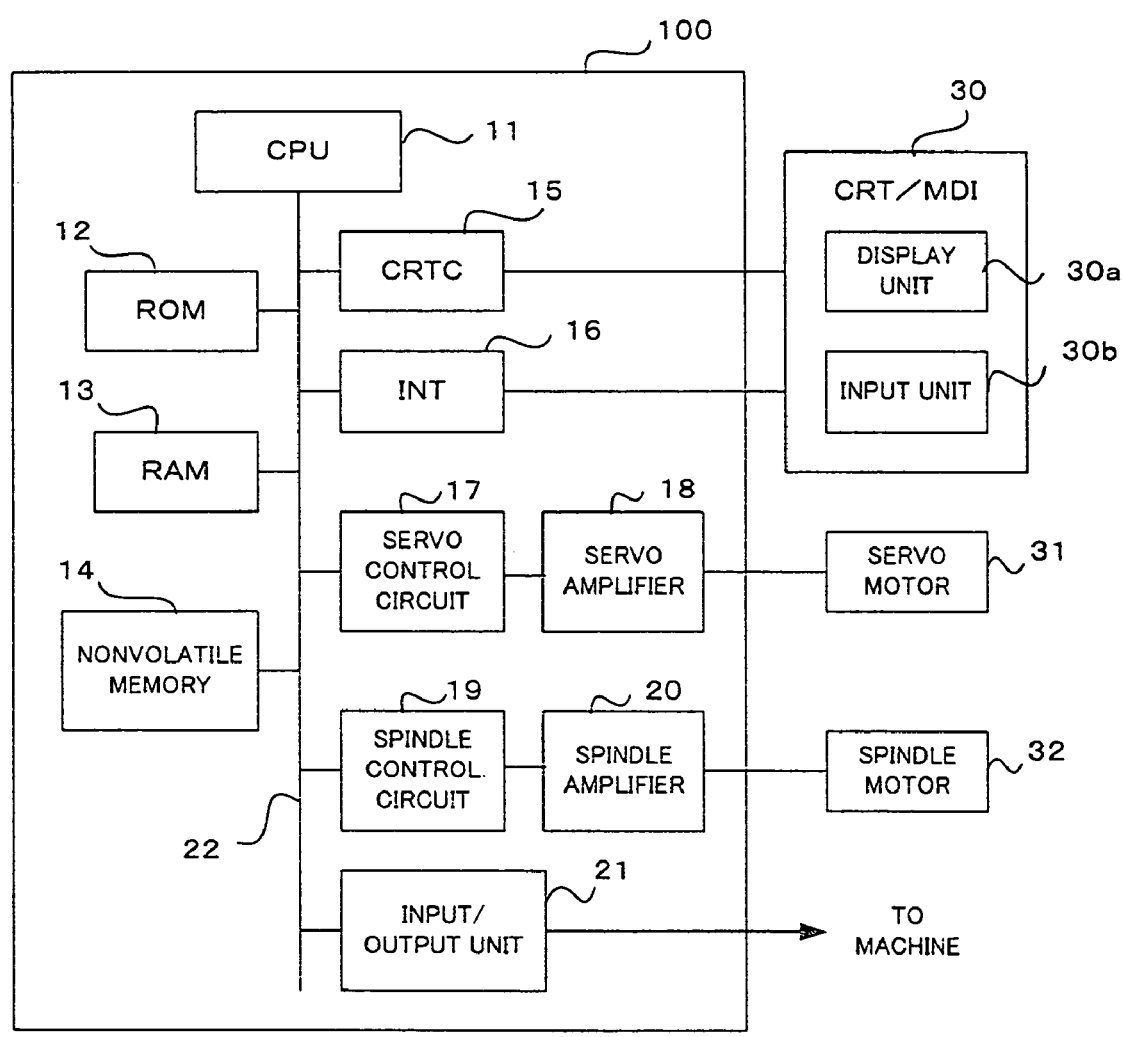
FIG. 1 is a block diagram of a controller which embodies the present invention.

FIG. 1 is a block diagram of a controller which embodies the present invention.

The controller 100 includes a CPU 11. Connected to the CPU 11 through a bus 22 are a ROM 12, a RAM 13, a nonvolatile memory 14, a CRT controller 15 for controlling a CRT display unit 30a of a CRT/MDI unit 30, an interface 16 connected to an input unit 30b, such as a keyboard, of the CRT/MDI unit 30, a servo control circuit 17 for controlling a servo motor 31 for each machine axis, a spindle control circuit 19 for controlling a spindle motor 32, and an I/O unit 21.

The CPU 11 controls the entire controller 100 according to sequence programs stored in the ROM 12. The RAM 13 is used for temporarily storing data and for other purposes. The nonvolatile memory (RAM) 14 includes NC programs that control axes of the machine connected to the controller 100 and also stores sequence programs. These programs are input into the controller 100 through an interface (not shown); alternatively, these programs are created using the CRT/MDI unit 30 and stored in the nonvolatile memory 14.

The servo control circuit 17 is connected to a servo motor 31 through a servo amplifier 18, and controls the position, speed, and other parameters of the servo motor 31. The spindle control circuit 19 is connected to a spindle motor 32 through a spindle amplifier 20, and controls the speed etc. of the spindle motor 32. The I/O unit 21 is connected to sensors and actuators of the machine. Although a single servo motor 31 is drawn in FIG. 1, as many servo motors 31 are provided as there are feed axes in the machine.

In this embodiment, driving of the machine is controlled by programs executed repeatedly at certain intervals, such as sequence programs that control the machine sequence, and by NC programs that control axis motion and start executing on command.

Conventional controllers have two types of programs: one type is executed according to an execution command and controls axis motion; the other type is executed periodically and controls the machine sequence. The axis motion control programs are NC programs or programs coded in motion language; the sequence control programs are coded in a language such as ladder diagram language. Different languages are needed for the two types of programs. In the embodiment of the present invention, however, the axis motion control programs and the periodically executed machine sequence control programs are both coded in NC program format, and each program is executed by the processor of the controller 100.

Sequence programs in this embodiment are coded in NC program format as described below.

In the coding of a sequence program, a specific symbol (a double slash //, for example) is placed at the beginning of each command block. Code in an NC program format, that is, G code, F code, or another language used in NC programs, is then used to create sequence control command statements. In this format, a signal name and address are coded on the left side and 0 (off) or 1 (on) is coded on the right side, representing the commanded status of the signal.

A basic programming example will be given below and compared with a ladder program.

Always-True Expression

A ladder program in which a certain signal is always on (in the example in FIGS. 2A and 2B, G22.3 is left turned on) is coded as in FIG. 2A. The corresponding command in a sequence program in this embodiment is coded as follows (see FIG. 2B):

//#IOG[22.3]=1;

The left side consists of a double slash (//), a signal name IOG coded in an NC program format, and the address 22.3; the right side gives the status of the signal.

Always-False Expression

A ladder program in which a certain signal is always off (in the example in FIGS. 3A and 3B, G22.3 is left turned off) is coded as in FIG. 3A. The corresponding command in a sequence program in this embodiment is coded as follows (see FIG. 3B):

//#IOG[22.3]=0;

Conditional Expression

A ladder program in which a certain signal is turned on if a condition holds (in the example in FIGS. 4A and 4B, signal G22.3 is turned on if signal F5.4 is on) is coded as in FIG. 4A. The corresponding commands in a sequence program in this embodiment are as follows (see FIG. 4B):

```
//IF[#IOF[5.4]==1];
//#IOG[22.3]=1;
//ELSE
//#IOG[22.3]=0;
```

A ladder program for an emergency stop function or the like is coded as in FIG. 5A. The corresponding command in this embodiment is as follows (see FIG. 5B):

//#IOG[8.4]=#IOX[0.4];

This command indicates that signal X0.4 and signal G8.4 are permanently connected. Since signal G8.4 changes together with signal X0.4, the command is equivalent to an emergency stop or the like.

As described above, sequence programs are also coded in NC program format. Sequence programs executed periodically for sequence control are prefixed with a specific symbol (//), so that they are distinguishable from NC programs that start execution only when so commanded by an execution command, as in conventional NC programs that control axis motion. When it is necessary to periodically execute a command that controls axis motion instead of performing sequence control, if the command is coded in NC program format and prefixed with a specific symbol (//), the command can be executed at fixed intervals as in sequence control.

For example, suppose that if an axis exceeds a limit, a safety unit for axis movement must restore the axis automatically by a predetermined amount. To execute this processing periodically, the following command can be coded:

//IF[#100101 GT 100] X-10;

The variable #100101 in this command reads the X axis position. If the X axis position exceeds 100 mm, the X axis is moved back by 10 mm.

Sequence programs thus created in NC program format but still executed at regular intervals (called sequence NC programs hereinafter) and normal NC programs for controlling axis motion and other motion are both stored in the nonvolatile memory 14 and executed.

Figure 6:
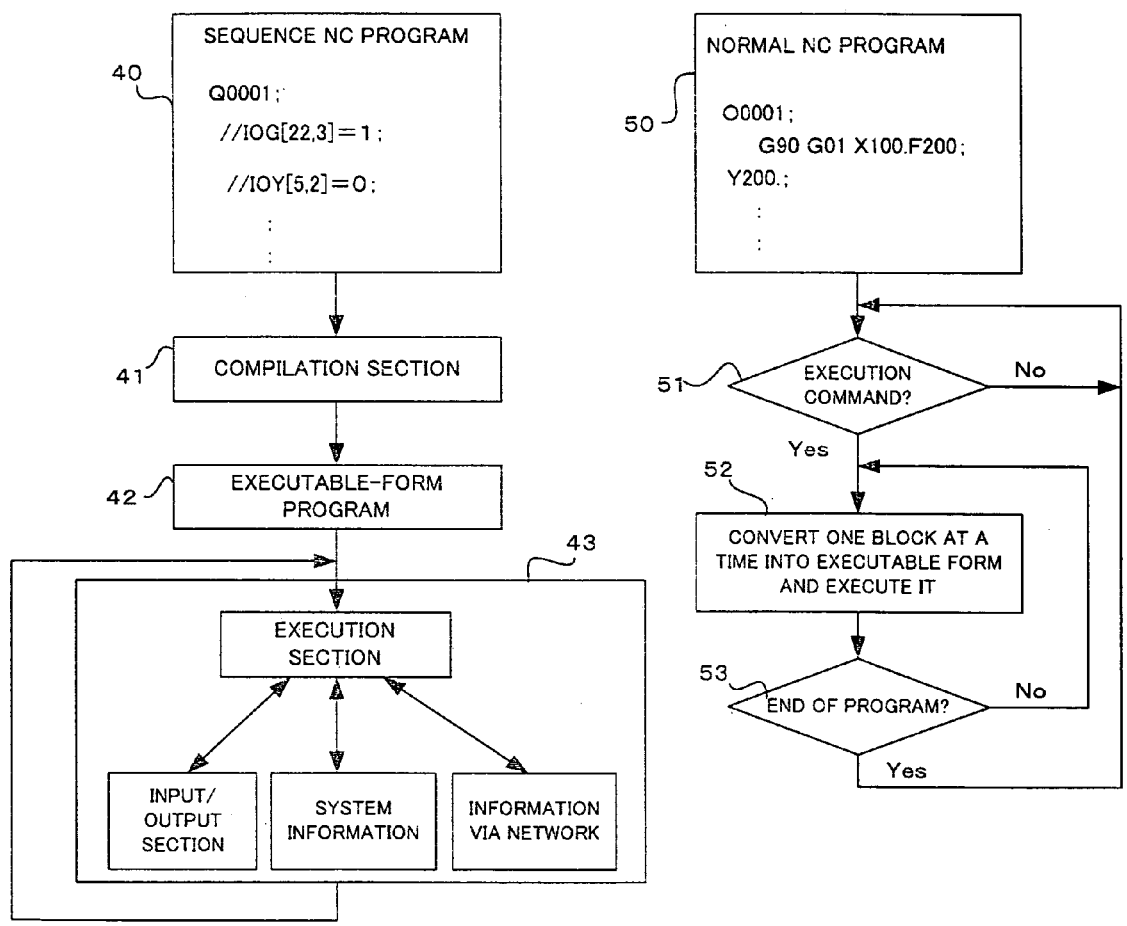
FIG. 6 is a flowchart illustrating the operation of this embodiment.

FIG. 6 is a flowchart illustrating the operation of this embodiment.

When the controller 100 is turned on, the CPU 11 converts a sequence NC program (shown at 40) into a program in executable form. Specifically, when the controller 100 is turned on, it reads a program stored in the nonvolatile memory 14. The controller may determine that because the commands in the program are prefixed with a specific symbol (//), the program is a sequence NC program (shown at 40). The controller then compiles the program (at 41), converts the compiled program into a list of simple commands in executable form, and further converts the list into a program in executable form (at 42).

For example, #100=1 is converted into the following three commands in executable form:

(1) A command that saves the address of #100 on the stack (PUSH#100)

(2) A command that saves 1 on the stack (PUSH1)

(3) A command that assigns the value at the top of the stack to the address of the second value from the top of the stack (POPP)

(The commands in parentheses are examples of actual commands.)

When this program is executed, computations can be carried out mechanically just by manipulating the stack, without needing to know the meanings of #100 and 1.

During execution, #100=1 is not interpreted; the above three executable-form commands are executed instead.

The controller 100 executes the program converted into executable form at predetermined intervals to receive signals from the machine via the I/O unit 21, transmit signals to the machine, and execute sequence control of system information and of signals input and output via a network control circuit (not shown) (at 43). The controller 100 executes the sequence NC program converted into executable form like this at predetermined intervals until the controller 100 is turned off.

If the program read at power-up is a normal NC program (shown at 50), the controller 100 reads the above sequence NC program and executes the operation described above until a command to execute the NC program is input (at 51). Upon input of an NC program execution command, the controller 100 reads the normal NC program one block at a time, converts each block into executable form, and executes the command in the block (at 52) to control axis motion and other functions. If the end of the program is encountered (at 53) while the normal NC program is being read and executed one block at a time, the controller 100 waits until another execution command is input.

Although, in this embodiment, a sequence NC program is interpreted and converted at power-up so as to obtain an executable-form program, the sequence program may be interpreted and converted to executable form when it is stored in the nonvolatile memory 14, so that the executable program is stored in the nonvolatile memory 14. The controller may also be adapted to compile programs periodically as long as power is on.

Furthermore, since the programs actually used are in executable form, it is not necessary to store the sequence NC programs which have not yet been converted; it is possible to store only the converted executable-form programs.

In the above embodiment, the commands in a sequence NC program to be executed periodically for sequence control or other purposes are prefixed with a specific symbol (//) to distinguish the program from a normal NC program that is executed only once according to an execution command to control axis motion. However, program names may also be used to make this distinction. For example, the program name of a program to be executed repeatedly at certain intervals (a sequence NC program) may begin with the letter Q, e.g., Q0001, and the program name of a normal NC program may use the conventional letter O, e.g., O0001, as shown in FIG. 6. When the CPU in the controller reads a program name, the CPU can determine whether the program is a sequence NC program to be executed repeatedly at certain intervals or a normal NC program to be executed only once for normal axis motion control each time an execution command is input.

As described above, the present invention provides a low-cost controller that can carry out both axis motion control and sequence control without having to use a special unit for program conversion, because programs coded in NC program format can be executed for sequence control.

The invention claimed is:

1. A controller for controlling a machine according to control programs which are created in an NC program format, comprising:

storage means for storing the control programs created in the NC program format in a way that distinguishes between a program to be executed periodically and a program to be executed according to an execution command;

conversion means for analyzing the programs stored in the storage means and converting the programs into programs in a form executable by the controller; and execution means for periodically executing the program to be executed periodically, converted by the conversion means into the executable form, from the time when power to the machine is turned on until the time when the power is shut down;

wherein the program to be executed periodically is distinguished from the program to be executed according to an execution command by affixing a specific symbol to each command coded in the program to be executed periodically.

2. The controller according to claim 1, wherein the program to be executed periodically controls a sequence of the machine, the machine being a machine tool or an industrial machine.

3. The controller according to claim 2, wherein the program for sequence control includes signal names of input/output signals for the machine and the controller, addresses of the input/output signals, and control commands for the input/output signals.

4. The controller according to claim 3, wherein the signals names and addresses of the input/output signals are coded with alphabetic characters and numeric characters.

5. The controller according to claim 2, wherein the program for sequence control includes a condition and a control command executed according to the condition.

6. The controller according to claim 1, wherein the program to be executed according to said execution command is a program that controls motion of an axis of the machine.

7. The controller according to claim 1, wherein said storage means stores the program in the executable form, which has been obtained by converting the program to be executed periodically by means of the conversion means, together with, or instead of, the program to be executed periodically.

8. The controller according to claim 1, wherein the conversion means converts the program to be executed periodically into the program in the executable form and stores the converted program in the storage means either when the machine is turned on or when the program is originally stored in the storage means.

9. A controller to control a machine according to control programs which are created in an NC program format, comprising:
- a storage to store the control programs created in the NC program format in a way that distinguishes between a program to be executed periodically and a program to be executed according to an execution command;
- a converter to analyze the programs stored in the storage and convert the programs into programs in a form executable by the controller; and
- an execution part to periodically execute the program to be executed periodically, converted by the converter into the executable form, from the time when power to the machine is turned on until the time when the power is shut down;
- wherein the program to be executed periodically is distinguished from the program to be executed according to an execution command by affixing a specific symbol to each command coded in the program to be executed periodically.

10. The controller according to claim 9, wherein the program to be executed periodically controls a sequence of the machine, the machine being a machine tool or an industrial machine.

11. The controller according to claim 10, wherein the program for sequence control includes signal names of input/output signals for the machine and the controller, addresses of the input/output signals, and control commands for the input/output signals.

12. The controller according to claim 11, wherein the signals names and addresses of the input/output signals are coded with alphabetic characters and numeric characters.

13. The controller according to claim 10, wherein the program for sequence control includes a condition and a control command executed according to the condition.

14. The controller according to claim 9, wherein the program to be executed according to said execution command is a program that controls motion of an axis of the machine.

15. The controller according to claim 9, wherein said storage means stores the program in the executable form, which has been obtained by converting the program to be executed periodically by way of the converter, together with, or instead of, the program to be executed periodically.

16. The controller according to claim 9, wherein the converter converts the program to be executed periodically into the program in the executable form and stores the converted program in the storage either when the machine is turned on or when the program is originally stored in the storage.

* * * * *